D. O. MACKAY.
VEHICLE TIRE.
APPLICATION FILED DEC. 21, 1915.

1,287,719.

Patented Dec. 17, 1918.
2 SHEETS—SHEET 1.

WITNESSES
INVENTOR
BY
ATTORNEYS

D. O. MACKAY.
VEHICLE TIRE.
APPLICATION FILED DEC. 21, 1915.
1,287,719.
Patented Dec. 17, 1918.
2 SHEETS—SHEET 2.
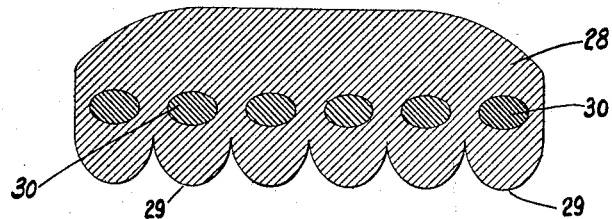
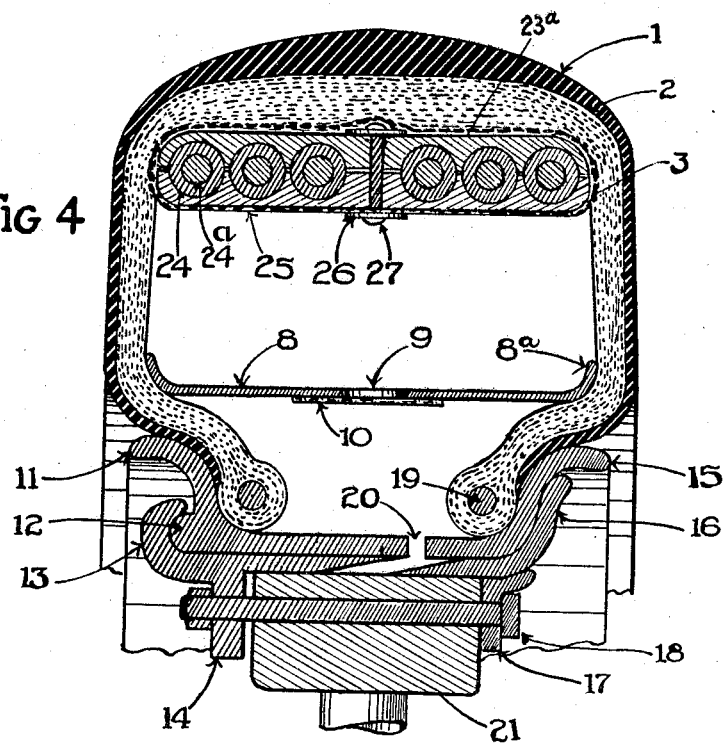
WITNESSES
INVENTOR

UNITED STATES PATENT OFFICE.

DAVID O. MACKAY, OF ROOSEVELT, UTAH.

VEHICLE-TIRE.

1,287,719.

Specification of Letters Patent.

Patented Dec. 17, 1918.

Application filed December 21, 1915. Serial No. 67,994.

*To all whom it may concern:*

Be it known that I, DAVID O. MACKAY, of Roosevelt, in the county of Duchesne, and in the State of Utah, have invented a certain new and useful Improvement in Vehicle-Tires, and do hereby declare that the following is a full, clear, and exact description thereof.

My invention relates to tires designed to be used on vehicles, but it has special utility in connection with tires on motor-driven vehicles.

The object of my invention is to provide an improvement in the type of tire which is mechanically distended. More particularly, the object of my invention is to provide a construction in which the tire is incapable of deflation when punctured, which does not require inflation, and in which, nevertheless, there is a very high degree of resiliency so as to absorb the shocks due to the traveling of the vehicle over the road.

While my invention is capable of embodiment in many different forms, for the purpose of illustration, I have shown only certain forms thereof in the accompanying drawings, in which, Figure 1 is a transverse section on line $x$—$x$, Fig. 2 of a tire made in accordance with my invention;

Fig. 4 is a section similar to Fig. 1 showing a modified form of my invention; and Fig. 5 is a transverse section of a modified form of fiber ring which may be used in connection with my invention.

Figure 1:
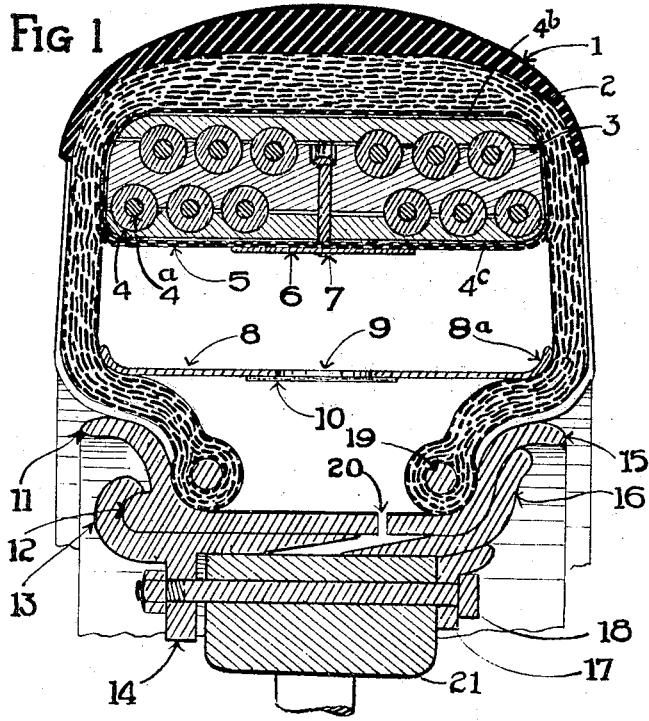
Figure 3:
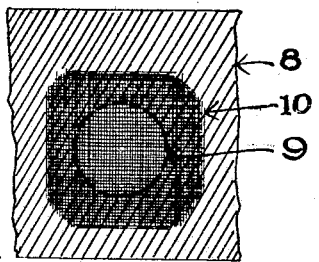
Fig. 3 is a plan view of a portion of the spreader-plate.
Figure 2:
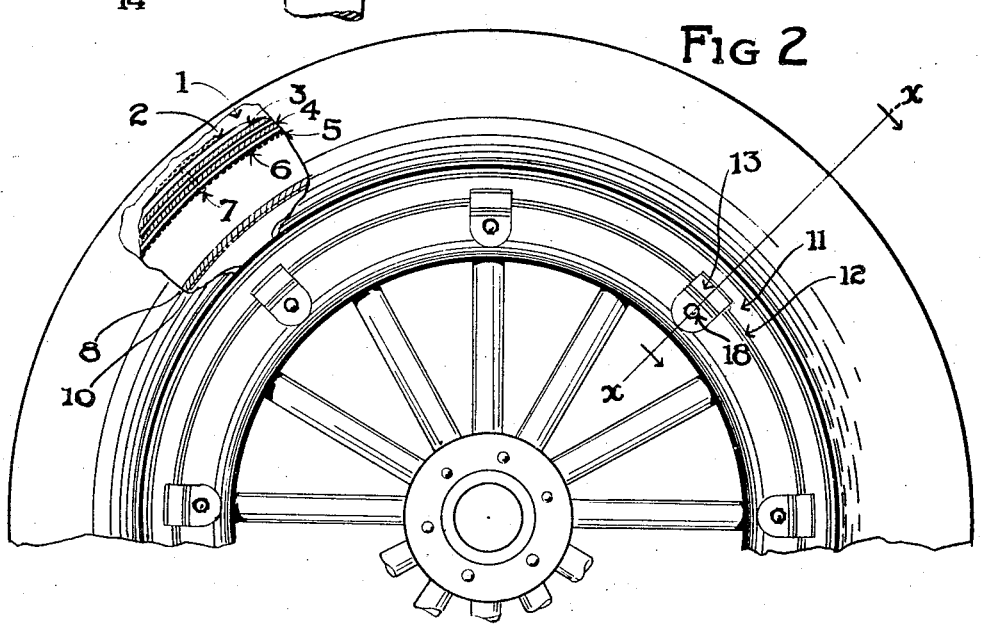
Fig. 2 is a side elevation partly broken away of a wheel to which my tire has been applied.

In the drawings I have shown a tire comprising an outer layer of rubber 1, on the extreme outer tread of the tire, which is attached to a main casing 2 made of layers of rubber fabric in the usual way in which tire casings are constructed. Inside of the casing 2 there is a central supporting band 3, made of wood fiber and having corrugations into which fit a plurality of rods or tubes 4 of wood fiber, which when hollow have passing centrally through the same, rings $4^a$ of vanadium spring steel. Above the rods or tubes 4, I may provide a further band of wood fiber $4^b$, and below the same a further band of the same material $4^c$. These three bands 3, $4^b$ and $4^c$ may be inclosed within a layer of rubberized fabric 5, which is secured in any desired manner to the inner tread portion of the tire casing. Beneath the layer of rubberized fabric 5 there is a spring steel ring 6, which is maintained in place by a plurality of rivets 7 located at intervals around the tread of the tire and passing into and secured to the central band of wood fiber 3. Near the bottom of the tire there is located a spreader-plate 8 having up-turned edges $8^a$ and central openings 9 at intervals covered by wire gauze 10 which is soldered to the under surfaces of the edges of the holes 9. This gauze covering for the openings 9 permits air to circulate throughout the inside of the tire casing, but prevents the entrance of water or other foreign matter. The spreader-plate 8 tends to spread outwardly the edges of the tire casing 2 against the rim of the wheel, which comprises a ring 11 having a ridge 12 along the exterior thereof, which is clamped in place by ears 13 on clamps 14. The other edge of the tire rests against an S-shaped ring 15 supported against a ring 16, maintained in place by a further ring 17 and bolts 18, which pass through the same and through the clamps 14. The edges of the casing 2 are maintained tight against the rim of the wheel, by rings 19 of spring steel which pass through said edges. A space 20 between rings 11 and 15, however, places the interior of the tire in communication with the outer air through the space between the felly 21 and the ring 11, which space is provided by the clamps 14. All of the parts just described are supported from a felly 21, which forms the outer periphery of the wheel.

In the modification of my invention shown in Fig. 4, the construction is the same except in the following respects. In this instance, there is a lower band of wood fiber 3, having recesses in its upper surface to receive rods or tubes 24, constructed the same as the rods or tubes 4, and there is an upper band of wood fiber $23^a$ having recesses fitting over the said rods or tubes 24. The bands 3 and $23^a$ are inclosed within a layer of rubberized fabric 25 and there is a band of spring steel 26 underlying the bands of wood fiber 3 and $23^a$, and clamped to the same by means of rivets 27 located at intervals around the tire.

In Fig. 5 I have shown a modified form of fiber ring which may be used in my invention, and which comprises a ring 28 of fiber, preferably having longitudinal corrugations 29 on its lower surface and made with or without the presence of steel rings 30 corresponding to the corrugations 29 and located in the body of wood fiber band 28. This fiber band 28 may be substituted in the tires shown in Figs. 1 and 4 in the place of the fiber rings there shown.

In the operation of my invention, the three forms of my invention operate in substantially the same way. It is not necessary to inflate the tire with compressed air, and a puncture to the tire will not have any disadvantageous effects for that reason. At the same time, a puncture could not very well occur, in view of the presence of the bands and rods secured to the inner surface of the tread of the tire. As the vehicle passes over the road, the rods and bands yield under the weight of the vehicle, and under the influence of the imperfections in the roadway, so as to provide the vehicle with a very resilient support thus relieving the same from any undesirable stresses.

While I have described my invention above in detail, I wish it to be understood that many changes may be made therein, without departing from the spirit of my invention.

I claim:

1. In a tire, a casing having its interior open to the outer air, a supporting band located therein, and an apertured spreader plate bracing the sides of the casing whereby a circulation of outer air is provided to the interior of said casing.

2. In a tire, a casing having its interior open to the outer air, and an apertured spreader plate bracing the same whereby a circulation of outer air is provided to the interior of said casing.

3. In a tire, the combination of a casing, a band of wood fiber located therein, and a separate tube having a steel ring therein, located within said band.

4. In a tire, a casing having its interior open to the outer air, a spreader plate therein having ventilating openings, and means for preventing the passage of foreign matter through said openings.

5. In a tire, the combination of a casing, a plurality of bands of wood fiber located within the same, and a separate tube having a steel ring therein, located between the said bands.

6. In a tire, the combination of a casing, a plurality of bands of wood fiber located within the same, a separate tube having a steel ring therein, located between the said bands, a steel band underlying said bands and inclosed by said casing.

7. In a tire, a casing, a plurality of bands within said casing having complementary recesses in their meeting faces, tubes disposed in said recesses, and reinforcing rings within said tubes.

8. In a tire, the combination of a casing, a plurality of supporting bands located within the same, and a separate tube having a ring of resilient metal therein, located between the said bands.

9. In a tire, the combination of a casing, a plurality of supporting bands located within the same, a separate tube having a ring of resilient metal therein, located between the said bands, and a band of resilient metal underlying the first mentioned bands and inclosed by said casing.

In testimony that I claim the foregoing I have hereunto set my hand.

DAVID O. MACKAY.

Witnesses:
ERNEST H. BURGESS,
HOMER P. EDWARDS.

Copies of this patent may be obtained for five cents each, by addressing the "Commissioner of Patents, Washington, D. C."